(12) United States Patent
Anderson et al.

(10) Patent No.: US 6,272,669 B1
(45) Date of Patent: *Aug. 7, 2001

(54) METHOD FOR CONFIGURING A PROGRAMMABLE SEMICONDUCTOR DEVICE

(75) Inventors: Howard C. Anderson, Tempe, AZ (US); Cezary Marcjan, Redmond, WA (US); David J. Anderson, Scottsdale; Danny A. Bersch, Gilbert, both of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,694

(22) Filed: Dec. 15, 1997

(51) Int. Cl.[7] .................................................. G06F 17/50
(52) U.S. Cl. ................................................. 716/16; 716/17
(58) Field of Search ....................... 395/500.17, 500.18, 395/500.02; 716/16, 17

(56) References Cited

U.S. PATENT DOCUMENTS

| 5,524,243 | 6/1996 | Gheorghiu | 713/1 |
|---|---|---|---|
| 5,557,531 | 9/1996 | Rostoker et al. | 395/500.02 |
| 5,838,972 | * 11/1998 | Matsuzuka et al. | 709/305 |
| 5,870,309 | * 2/1999 | Lawman | 395/500.07 |
| 5,946,478 | * 8/1999 | Lawman | 395/500.18 |

OTHER PUBLICATIONS

McCarley et al "Marco–Instruction Generation for Dynamic Logic Caching," IEEE, pp. 63–69, Jan. 1997.*

Hakkarainen et al. "VHDL Macro Library Testing Using Board Emulation Tool," IEEE, pp. 105–108, Jan. 1995.*

* cited by examiner

Primary Examiner—Matthew Smith
Assistant Examiner—Vuthe Siek
(74) Attorney, Agent, or Firm—Robert F. Hightower (57) ABSTRACT

A method is provided for configuring a programmable semiconductor device. The method includes using the configuration data of a macro (53A) or a plurality of macros to configure the programmable semiconductor device. The configuration data of the macro (53A) is combined with the configuration data of a work area (10). The programmable semiconductor device is configured using the combined configuration data of the macro (53A) and the work area (10).

20 Claims, 7 Drawing Sheets

METHOD FOR CONFIGURING A PROGRAMMABLE SEMICONDUCTOR DEVICE

BACKGROUND OF THE INVENTION

The present invention relates, in general, to semiconductor devices, and more particularly, to programmable semiconductor devices.

Programmable semiconductor devices such as Application Specific Integrated Circuits (ASICs), Field Programmable Analog Arrays (FPAAs), and Field Programmable Gate Arrays (FPGAs) are programmed with configuration data to either initialize or alter their configuration and operation. High level design languages such as a Hardware Description Language (HDL) are commonly used to aid in configuring programmable semiconductor devices. A drawback of using high level design languages is that they do not contain the configuration data required for directly programming a programmable semiconductor device. Typically, methods for deriving low level configuration data from high level design languages include using a compiler or a layout program. These methods are computer implemented processes for converting design data of high level design languages to configuration data. A disadvantage of these methods is the possibility of errors associated with these processes. An example of a possible error is a layout error that can negatively affect the operation of a programmable semiconductor device.

Accordingly, it would be advantageous to have a method for configuring a programmable semiconductor device that eliminates processes for deriving configuration data from high level design languages. It would be of further advantage for the method to be reliable and cost efficient.

DETAILED DESCRIPTION OF THE DRAWINGS

Generally, the present invention provides a method for configuring a programmable semiconductor device using macros. A macro is a circuit block, sub-circuit block, or icon that contains configuration data to configure a programmable semiconductor device or a programmable circuit. Configuration data is used to program or configure a programmable semiconductor device. Since a macro contains configuration data, macros can be used to design a programmable semiconductor device and program it directly, eliminating the need for a process to derive configuration data from high level design data.

Figure 1:
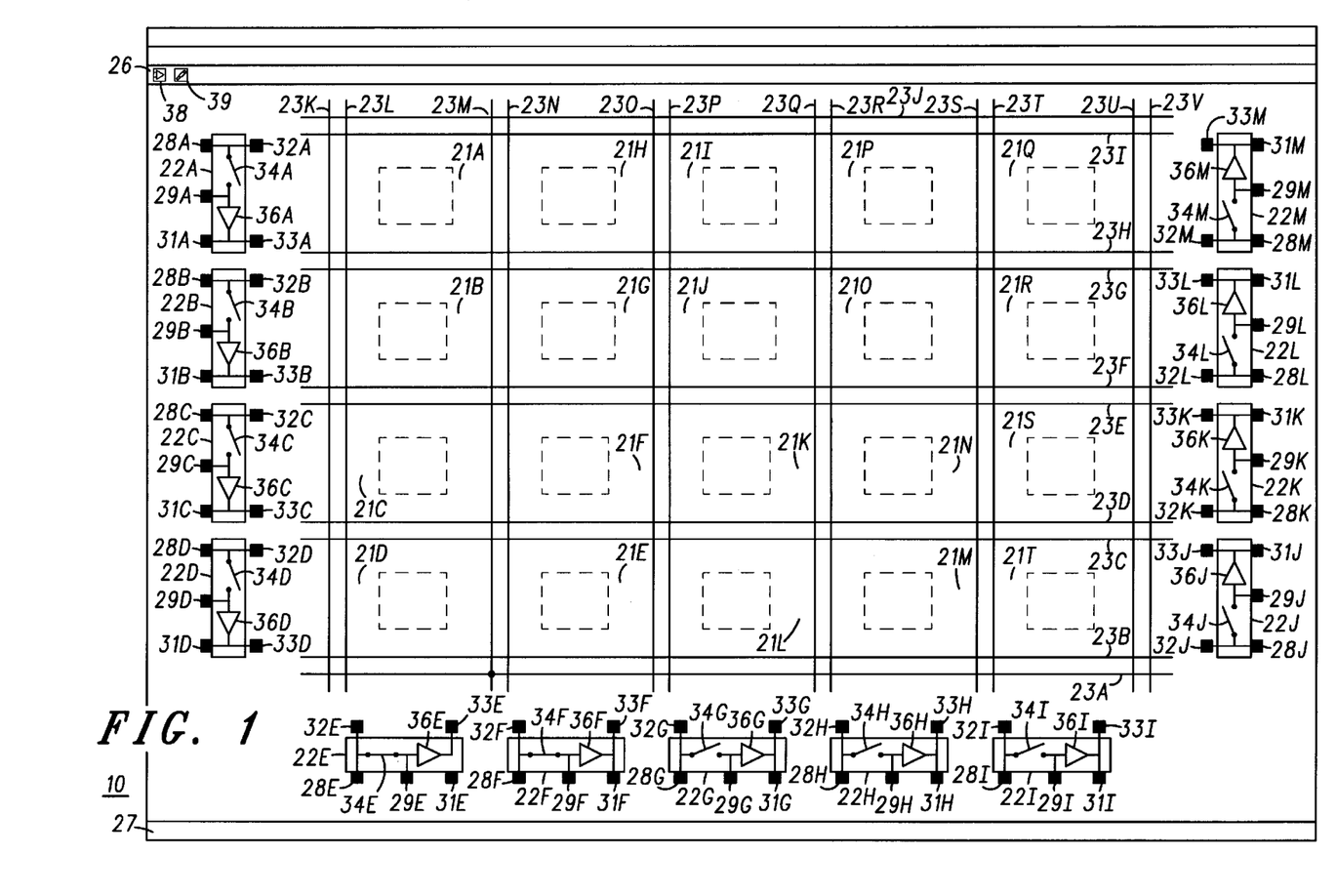
FIG. 1 is an illustration of a work area for configuring a semiconductor device in accordance with a first embodiment of the present invention.

FIG. 1 is an illustration of a work area 10 for configuring a semiconductor device in accordance with a first embodiment of the present invention. Work area 10 has a plurality of zones 21A–21T, a plurality of Input/Output (I/O) blocks 22A–22M, a plurality of global lines 23A–23V, a shortcut area 26, and a status area 27. The number of zones, I/O blocks, global lines, shortcut areas, and status areas of work area 70 is not a limitation of the present invention. Macros (not shown) having configuration data can be placed in the zones of work area 10. The configuration data of work area 10 and the configuration data of macros placed in work area 10 are used for programming a programmable semiconductor device such as, for example, an Application Specific Integrated Circuit (ASIC), a Field Programmable Analog Array (FPAA), a Field Programmable Gate Array (FPGA), or the like. A work area can be referred to as a design area. Configuration data can be a series of bits or a bitstream that is transmitted to a programmable semiconductor device to either initialize or alter the configuration or operation of the semiconductor device.

By way of example, configuration data is used to configure an FPAA (not shown) to operate as a pulse-width modulator. The FPAA is comprised of a plurality of circuit elements. More particularly, the FPAA includes twenty zones or cells. Each zone is comprised of a plurality of switches, five capacitors, and an operational amplifier. Switched-capacitor technology is used to configure the FPAA to operate as an analog device such as, for example, an analog amplifier, an oscillator, a comparator, a Direct Current (DC) voltage source, a rectifier, a filter, a pulse-width modulator, etc. The FPAA has Input/Output (I/O) terminals to couple the FPAA to other electronic components.

In accordance with the FPAA example, work area 10 is an equivalent schematic representation of the FPAA. Each zone of the plurality of zones of work area 10 corresponds or maps to a zone of the FPAA. Each I/O block has three external terminals, two internal terminals, a switch, and an amplifier. For example, I/O block 22A has external terminals 28A, 29A, and 31A, internal terminals 32A and 33A, a switch 34A, and an amplifier 36A. I/O block 22B has external terminals 28B, 29B, and 31B, internal terminals 32B and 33B, a switch 34B, and an amplifier 36B. Likewise, I/O blocks 22C–22M respectively have external terminals 28C–28M, 29C–29M, and 31C–31M, internal terminals 32C–32M and 33C–33M, switches 34C–34M, and amplifiers 36C–36M. External terminals 28A–28M, 29A–29M, and 31A–31M of each respective I/O block 22A–22M, respectively, map to the I/O terminals of the FPAA. The function of internal terminals 32A–32M and 33A–33M of each respective I/O block 22A–22M is to couple a global line or a terminal of a macro to a respective I/O block. Switches 34A–34M of each respective I/O block 22A–22M can be closed or opened and amplifiers 36A–36M of each respective I/O block 22A–22M can be on or off. Terminals of macros are coupled to terminals of other macros, internal terminals of I/O blocks, and global lines via connection lines (not shown).

Shortcut area 26 has a macro selection area 38 and a line connection area 39. Macro selection area 38 displays a plurality of macros from a macro library when selected or contacted by a selection device (not shown). Line connection area 39 is used to make connections between global lines, the terminals of macros, and the terminals of I/O blocks when selected by a selection device.

FIGS. 2–6 further illustrate the process of configuring a semiconductor device using a macro and work area 10 in accordance with the present invention. It should be understood that the same reference numerals are used in the figures to denote the same elements. A macro is chosen by contacting macro selection area 38.

Figure 2:
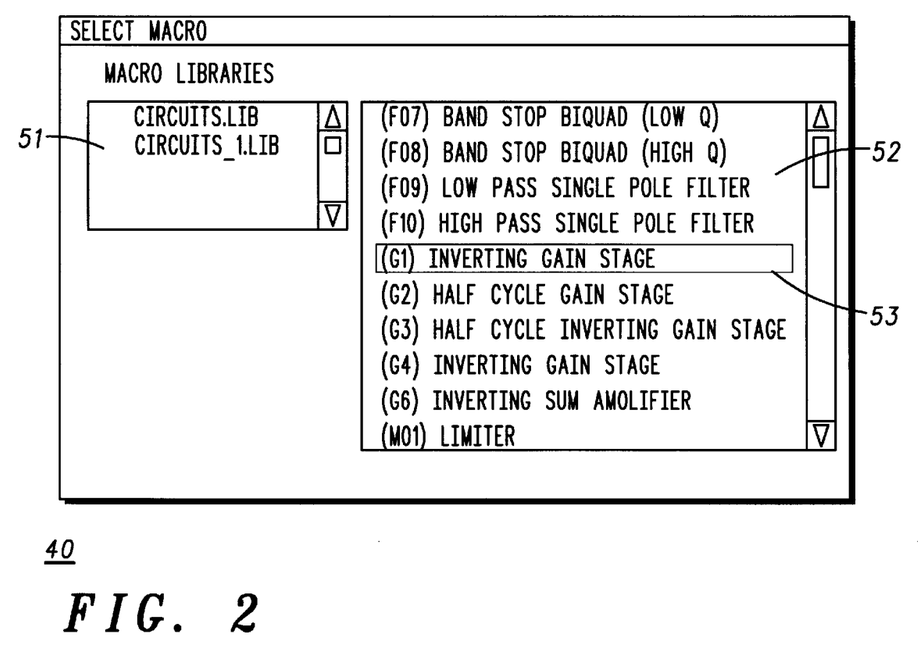
FIG. 2 is a select macro dialog box in accordance with the present invention.

FIG. 2 is a select macro dialog box 40 in accordance with the present invention. More particularly, select macro dialog box 40 is displayed after macro selection area 38 of work area 10 (FIG. 1) has been contacted by a selection device (not shown). A selection device can be a computer peripheral device such as, for example, a mouse, a trackball, a joystick, or the like. Select macro dialog box 40 has a macro libraries display area 51 and a macros display area 52. Macro libraries display area 51 contains a plurality of macro libraries. Each macro library has a plurality of macros. The plurality of macros are displayed in macros display area 52. By way of example, an inverting gain stage macro 53 is selected from the circuit library.

Figure 3:
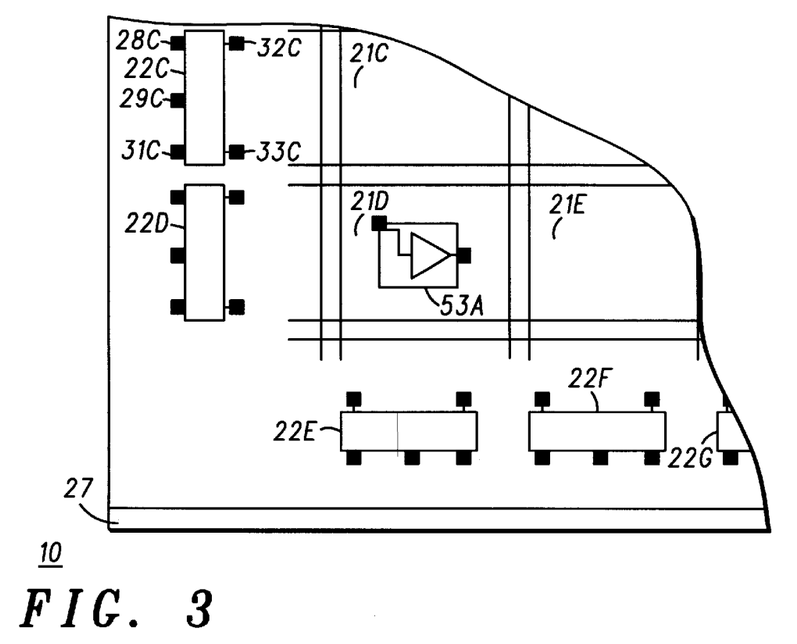
FIG. 3 illustrates the work area of FIG. 1 further along in the process of configuring a semiconductor device.

FIG. 3 illustrates work area 10 further along in the process of configuring a semiconductor device. More particularly, FIG. 3 illustrates the process of placing macro 53 in work area 10. After macro 53 has been selected from select macro dialog box 40, a schematic representation of macro 53 is generated and denoted macro 53A. Macro 53A is placed in zone 21D.

Figure 4:
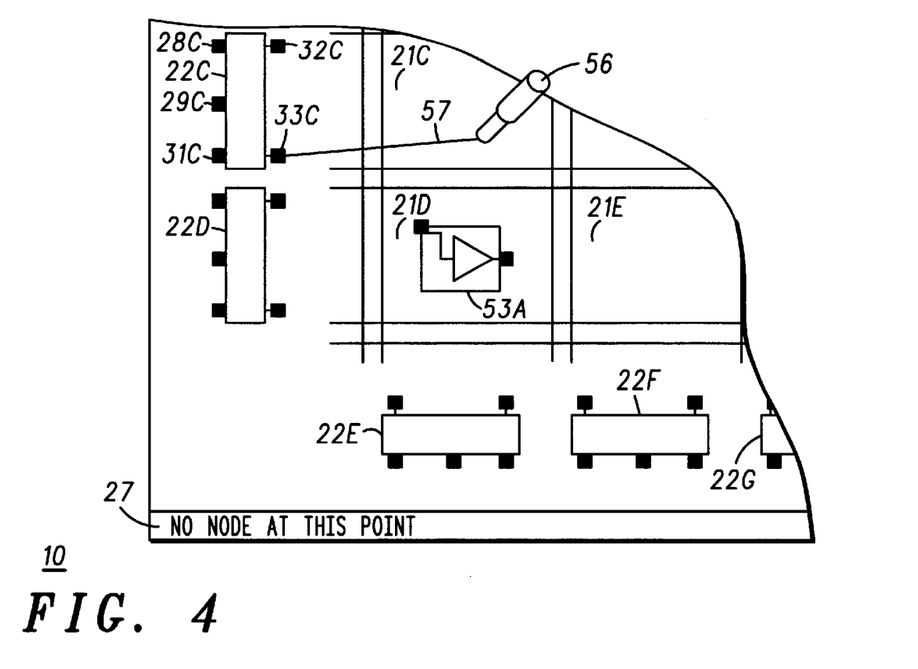
FIG. 4 illustrates the work area of FIG. 1 further along in the process of configuring a semiconductor device.

FIG. 4 illustrates work area 10 further along in the process of configuring a semiconductor device. More particularly, FIG. 4 illustrates the process of connecting macro 53A to I/O block 22C. A connection tool 56 is displayed by contacting line connection area 39 (FIG. 3). A first terminal of a connection line 57 is connected to terminal 33C of I/O block 22C using connection tool 56. Status area 27 dynamically displays a plurality of text messages to signal valid connections and connection restrictions within work area 10. In other words, the plurality of text messages displayed in status area 27 continuously signal whether a connection with connection tool 56 can or cannot be made and the reason a connection cannot be made at a particular point within work area 10. For example, placing connection tool 56 in zone 21C results in the text message "no node at this point" being displayed in status area 27. In addition, color codes are used to signal a valid connection. By way of example, an input terminal of macro 53A is green when connection tool 56 is not on the input terminal of macro 53A.

Figure 5:
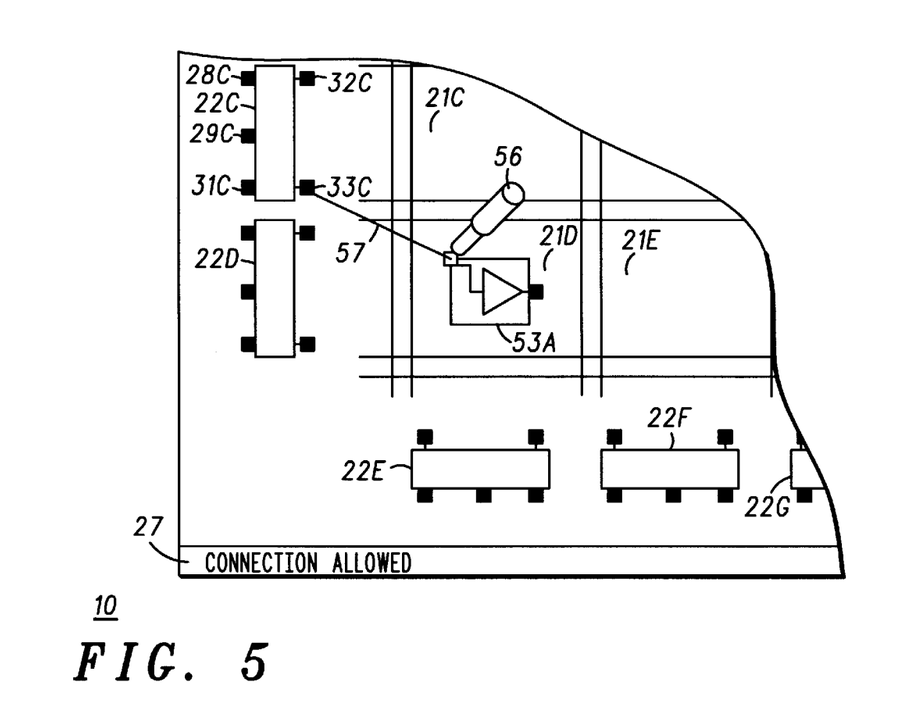
FIG. 5 illustrates the work area of FIG. 1 further along in the process of configuring a semiconductor device.

FIG. 5 illustrates work area 10 further along in the process of configuring a semiconductor device. More particularly, FIG. 5 further illustrates the process of connecting macro 53A to I/O block 22C. Status area 27 displays the text message "connection allowed" when placing connection tool 56 on the input terminal of macro 53A. In addition, when placing connection tool 56 on the input terminal of macro 53A, the input terminal of macro 53A turns blue or is highlighted to signify a valid connection.

Figure 6:
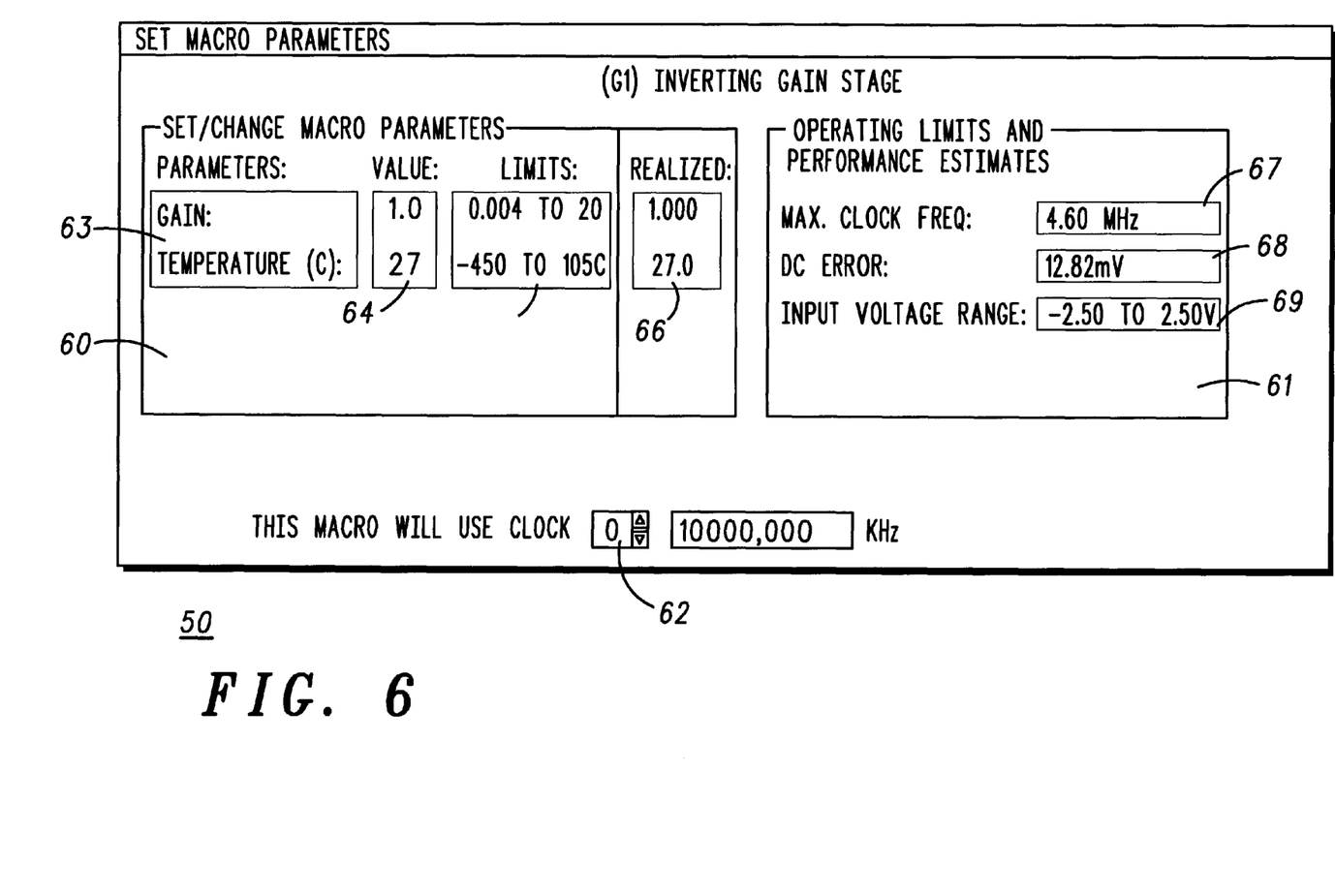
FIG. 6 is a set macro parameters dialog box for a macro in accordance with the present invention.

FIG. 6 is a set macro parameters dialog box 50 for macro 53A in accordance with the present invention. More particularly, FIG. 6 illustrates the process of manipulating macro 53A. Each macro has a plurality of functions and a plurality of parameters that are input or manipulated by using a set macro parameters dialog box such as set macro parameters dialog box 50. Set macro parameters dialog box 50 has a set/change macro parameters area 60, an operating limits and performance estimates area 61, and a clock area 62. A database containing information about the behavior of the circuit elements of the FPAA is created by performing simulations of the FPAA. Area 60 contains the parameters of macro 53A that can be entered or manipulated and area 61 contains the operating limits and performance estimates data of macro 53A. The operating limits and performance estimates data of macro 53A are calculated using the functions of macro 53A, the parameters of macro 53A, and the database containing information about the circuit behavior of the FPAA. More particularly, area 60 has a parameter area 63, a value area 64, a limits area 65, and a realized area 66. Area 61 has a max clock freq area 67, a DC error area 68, and an input voltage range area 69. Clock area 62 is used for entering or manipulating a divide-down clock of macro 53A. Parameter area 63 displays the parameters of macro 53A that can be manipulated, i.e., gain, temperature, etc. Value area 64 is used for entering or manipulating the parameters of macro 53A. Limits area 65 displays the acceptable range of values for the parameters of macro 53A that can be entered into value area 64. Realized area 66 displays the parameter values that are achieved due to accuracy limitations of the FPAA. Max clock freq area 67, DC error area 68, and input voltage range area 69 display the operating limits and performance estimates data for macro 53A. The functions of macro 53A are used in cooperation with the parameters of realized area 66 and the database to calculate the operating limits and the performance estimates data of macro 53A. The operating limits and performance estimates data are dynamically displayed in accordance with the parameters entered in value area 64. In other words, manipulating the parameters of value area 64 results in the operating limits and performance estimates data of areas 67, 68, and 69 being recalculated and displayed accordingly. It should be noted that each macro has its own set of parameters and functions. Some macros have no parameter data and do not have a divide-down clock.

Briefly referring back to FIG. 5, the configuration data of macro 53A and the configuration data of work area 10 are combined during the process of placing, connecting, and manipulating macro 53A. After the configuration data of macro 53A and the configuration data of work area 10 are combined, the combined configuration data is transmitted to the FPAA to configure it to operate as an inverting gain stage.

Figure 7:
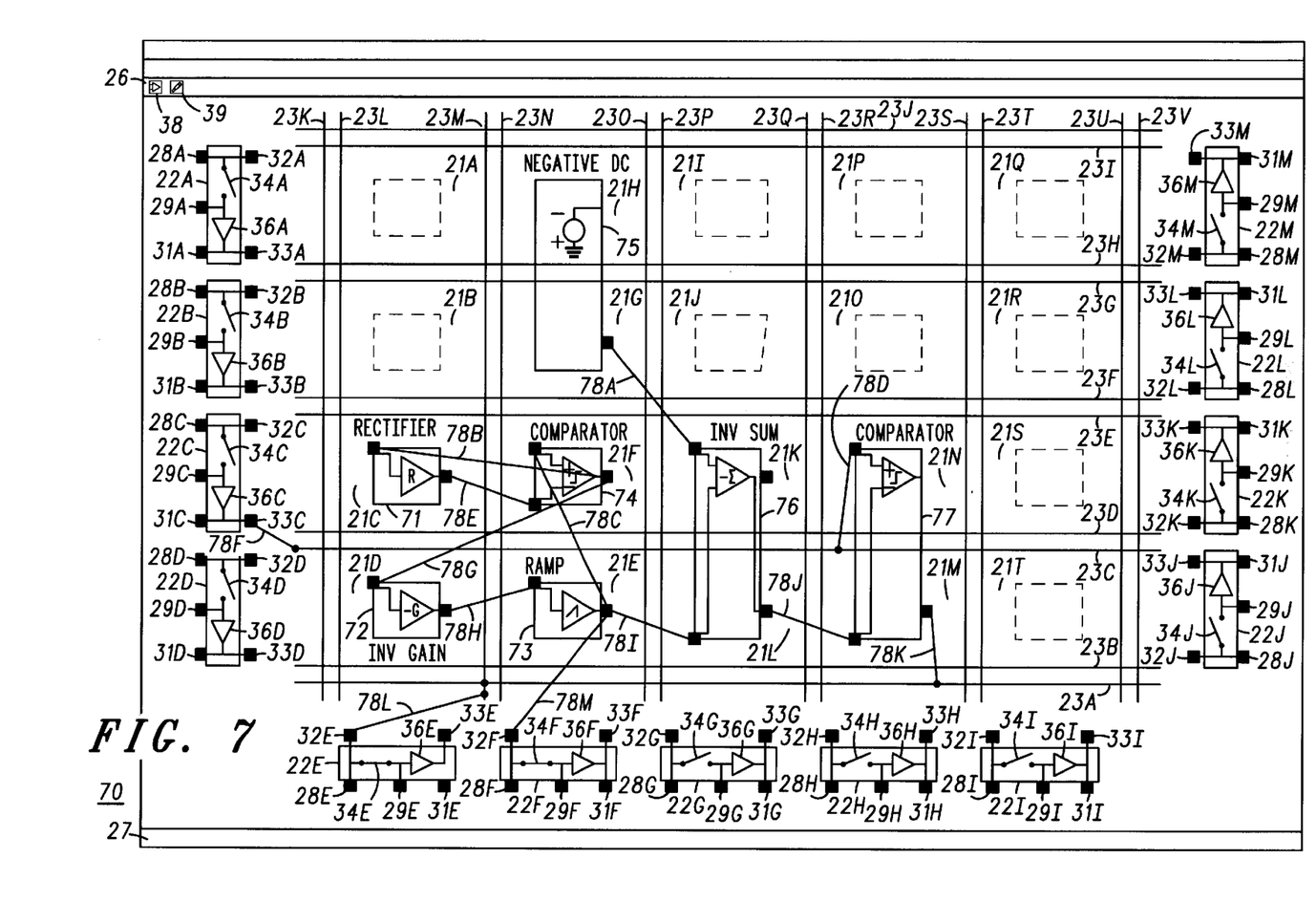
FIG. 7 illustrates a work area for configuring a semiconductor device in accordance with another embodiment of the present invention

FIG. 7 illustrates a work area 70 for configuring a semiconductor device in accordance with another embodiment of the present invention. Work area 70 is similar to work area 10 of FIG. 1 except that a plurality of macros 71, 72, 73, 74, 75, 76, and 77 are placed in work area 70. In addition, the plurality of macros are connected to each other, the global lines of work area 70, and the I/O blocks of work area 70 via a plurality of connection lines 78A–78M. By way of example, work area 70 is used to configure the FPAA described in FIG. 1.

Each macro has a plurality of input terminals and a plurality of output terminals. The input terminals of the plurality of macros are staggered with respect to the output terminals of the plurality of macros. In other words, the input terminals of the plurality of macros are not aligned to the output terminals of the plurality of macros. Staggering the input terminals and the output terminals of the plurality of macros prevents multiple connection lines from overlying each other.

Macros 71, 72, 73, and 74 are placed in zones 21C, 21D, 21E, and 21F, respectively. Macro 75 is placed in zones 21G and 21H. Macro 76 is placed in zones 21L and 21K. Macro 77 is placed in zones 21M and 21N. Terminal 33C of I/O block 22C is connected to global line 23C via connection line 78F. An input terminal of macro 71 is connected to an output terminal of macro 74 via connection line 78B. An output terminal of macro 71 is connected to a first input terminal of macro 74 via connection line 78E. A second input terminal of macro 74 is connected to an output terminal of macro 73 via connection line 78C. An input terminal of macro 72 is connected to the output terminal of macro 74 via connection line 78G. An output terminal of macro 72 is connected to an input terminal of macro 73 via connection line 78H. The output terminal of macro 73 is connected to terminal 32F of I/O block 22F via connection line 78M. The output terminal of macro 73 is connected to a first input terminal of macro 76 via connection line 78I. An output terminal of macro 75 is connected to a second input terminal of macro 76 via connection line 78A. An output terminal of macro 76 is connected to a first input terminal of macro 77 via connection line 78J. A second input terminal of macro 77 is connected to global line 23C via connection line 78D. An output terminal of macro 77 is connected to global line 23A via connection line 78K.

Referring to I/O block 22E, terminal 32E of I/O block 22E is connected to global line 23M via connection line 78L. Global line 23A is connected to global line 23M.

The process of designing an FPAA circuit in accordance with the present invention includes selecting, placing, and connecting a plurality of macros in a work area. When a macro is placed and connected in a work area, the configuration data of the macro is combined with the configuration data of the work area. By way of example, when a macro is placed in a zone of a work area, the bitstream of the macro is combined with the bitstream of the zone. The combined bitstream is transmitted to a programmable semiconductor device. In the example of FIG. 7, the combined configuration data of the plurality of macros and work area 70 is transmitted to an FPAA. The combined configuration data of work area 70 and the plurality of macros configures the FPAA to operate as a pulse-width modulator. It should be noted that combining the configuration data of a macro and the configuration data of a work area is not a limitation of the present invention. The configuration data of a macro is sufficient to program a programmable semiconductor device.

Figure 8:
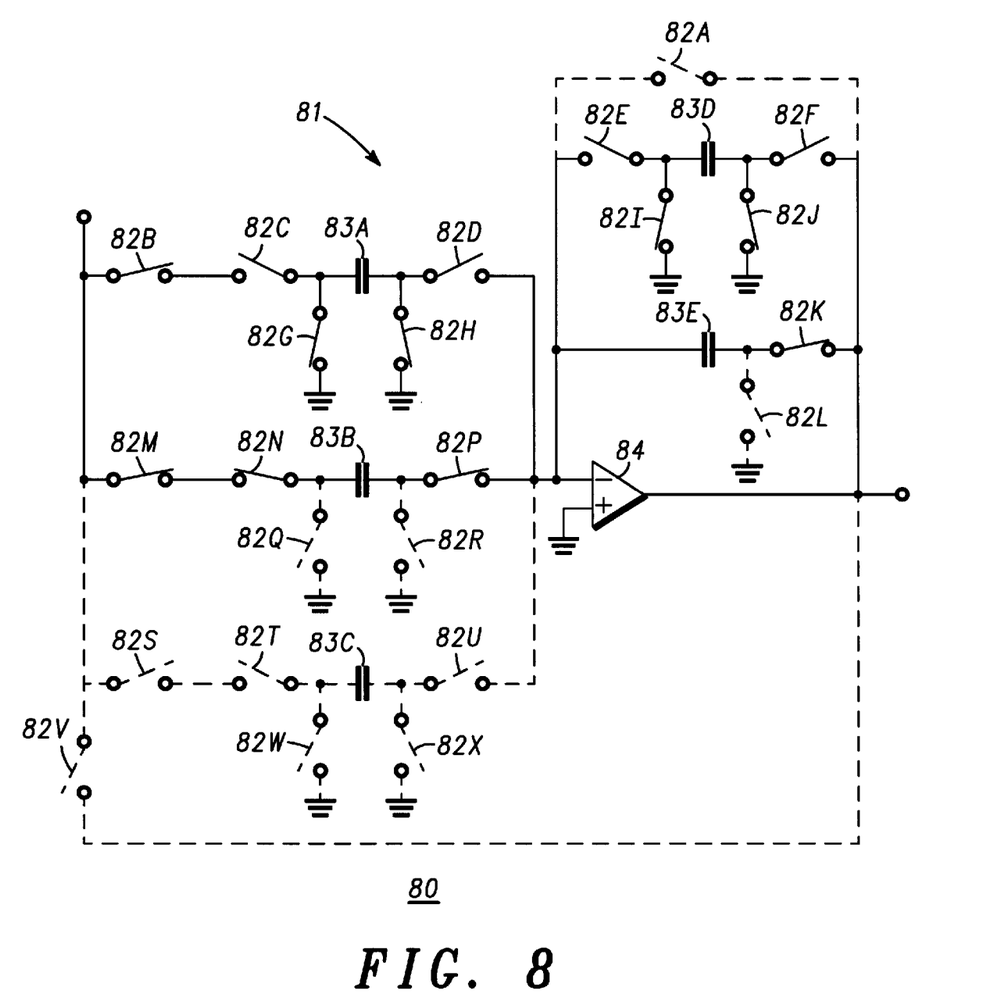
FIG. 8 is a macro work area for designing a macro in accordance with another embodiment of the present invention.

FIG. 8 is a macro work area 80 for designing a macro in accordance with another embodiment of the present invention. Macro work area 80 is a schematic representation of internal portions of a macro. By way of example, macro work area 80 can be used in the design of an analog amplifier macro for configuring an FPAA (not shown). Macro work area 80 has a schematic of a switched-capacitor circuit 81 which is comprised of a plurality of dynamic switches 82A–82X, a plurality of capacitors 83A–83E, and an operational amplifier 84. The first terminal of switch 82B is commonly connected to the first terminals of switches 82M, 82S, and 82V. The first terminal of switch 82C is commonly connected to the first terminal of capacitor 83A and the first terminal of switch 82G. The second terminal of switch 82G is coupled for receiving a power supply voltage such as, for example, ground. The second terminal of capacitor 83A is commonly connected to the first terminals of switches 82D and 82H. The second terminal of switch 82H is coupled for receiving a power supply voltage such as, for example, ground. The first terminal of switch 82N is commonly connected to the first terminal of capacitor 83B and the first terminal of switch 82Q. The second terminal of switch 82N is connected to the second terminal of switch 82M. The second terminal of capacitor 83B is commonly connected to the first terminals of switches 82P and 82R. The second terminal of switch 82P is commonly connected to the first terminal of switch 82A, the first terminal of capacitor 82E, and the inverting input of operational amplifier 84. The non-inverting input of operational amplifier 84 is coupled for receiving a power supply voltage such as, for example, ground. The output of operational amplifier 84 is connected to the second terminal of switch 82K. The second terminal of capacitor 83E is commonly connected to the first terminals of switches 82K and 82L. The first terminal of switch 82E is commonly connected to the first terminal of capacitor 83D and the first terminal of switch 82I. The second terminal of capacitor 83D is commonly connected to the first terminals of switches 82F and 82J. The first terminal of switch 82T is commonly connected to the first terminal of capacitor 83C and the first terminal of switch 82W. The second terminal of capacitor 83C is commonly connected to the first terminals of switches 82U and 82X.

Switched-capacitor circuit 81 uses switched-capacitor technology to create macros of circuits such as filters, amplifiers, oscillators, Direct-Current (DC) voltage sources, comparators, rectifiers, etc. Switched-capacitor technology uses the plurality of dynamic switches to switch the plurality of capacitors in and out of switched-capacitor circuit 81 to make the plurality of capacitors function as resistors. The plurality of dynamic switches open and close in accordance with a first phase and a second phase of a clock signal (not shown) and create an active portion and an inactive portion of switched-capacitor circuit 81. The active portion of switched-capacitor circuit 81 is displayed using solid lines and the inactive portion of switched-capacitor circuit 81 is displayed using broken lines. Macro work area 80 dynamically displays switched-capacitor circuit 81 in accordance with the first phase and the second phase of the clock signal. In other words, switched-capacitor circuit 81 is displayed in a first configuration during the first phase of the clock signal and switched-capacitor circuit 81 is displayed in a second configuration during the second phase of the clock signal. FIG. 8 illustrates switched-capacitor circuit 81 in the first configuration. Further, FIG. 8 illustrates the active portions and the inactive portions of switched-capacitor circuit 81 during the first phase of the clock signal. Although macro work area 80 is described as having switches, capacitors, and an operation amplifier, this is not a limitation of the present invention. Macro work area 80 can include a plurality of electrical components such as resistors, logic gates, transistors, etc.

Figure 9:
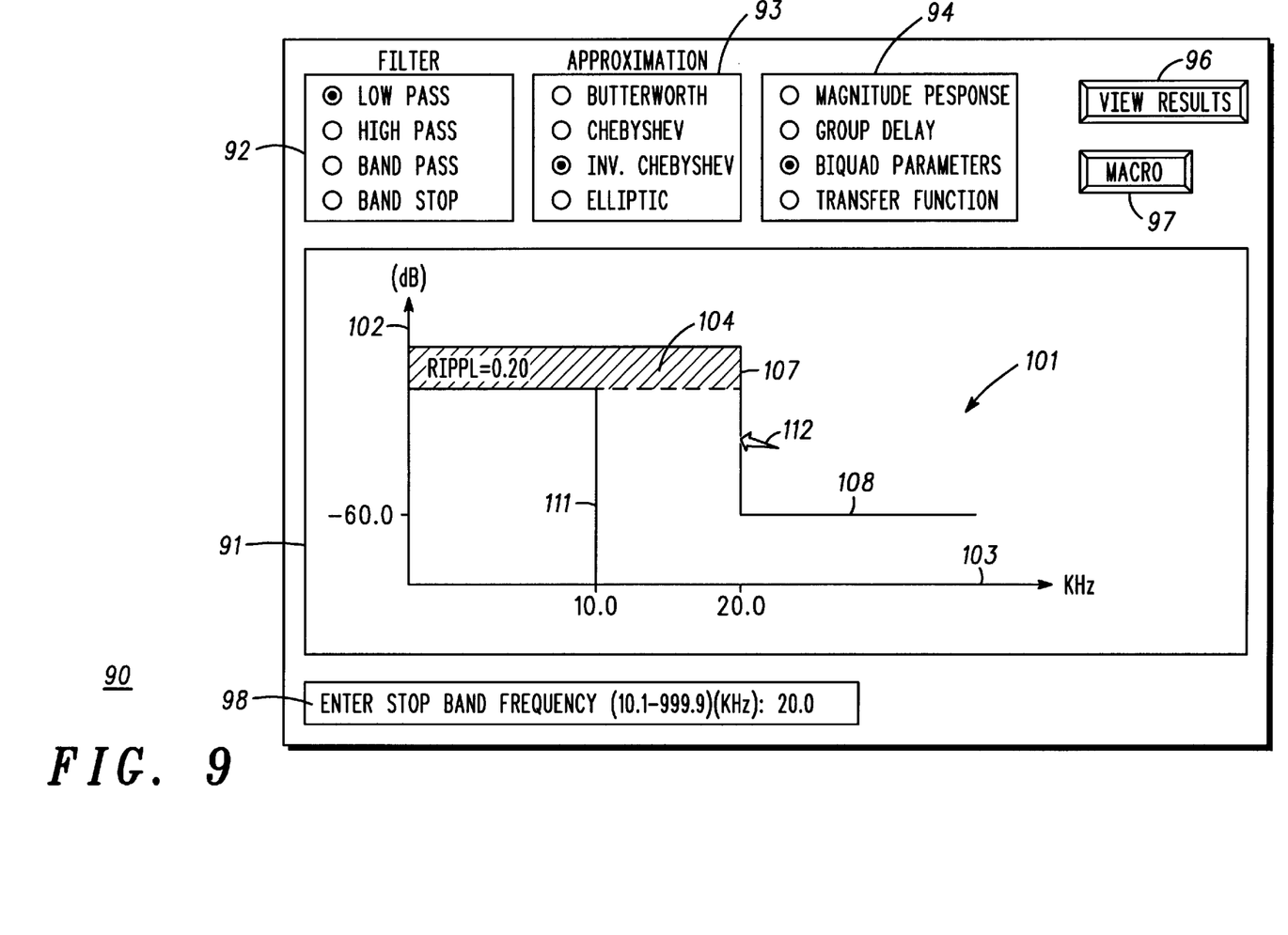
FIG. 9 is a macro work area used for creating a macro in accordance with another embodiment of the present invention.

FIG. 9 is a macro work area 90 used for creating a macro in accordance with another embodiment of the present invention. Macro work area 90 has an output graphic area 91, a filter area 92, an approximation area 93, a results area 94, a view results area 96, a macro area 97, and a parameter entry area 98. Filter area 92 displays or provides a plurality of filter circuit schematics. The plurality of filter circuit schematics includes a low-pass filter, a high-pass filter, a band-pass filter, and a band-stop filter. Other types of filters can be included in filter area 92. Approximation area 93 displays a plurality of filter approximations. The plurality of filter approximations includes a Butterworth approximation, a Chebyshev approximation, an inverse Chebyshev approximation, and an elliptic approximation. Results area 94 provides a plurality of formats. The plurality of formats includes a magnitude format, a group delay format, a biquad format, and a transfer function format.

By way of example, macro work area 90 is used to create or design a Low-Pass Inverse Chebyshev (LPIC) filter macro having configuration data and design parameters. The design parameters of the LPIC filter macro include a low-pass ripple parameter, a low-pass attenuation parameter, a stop-band frequency parameter, a stop-band minimum attenuation parameter, and a pass-band frequency parameter. Altering the design parameters of the LPIC filter macro changes the configuration data of the LPIC filter macro. The configuration data of the LPIC filter macro is used to configure an FPAA(not shown). Filter area 92 cooperates with approximation area 93 to select a filter macro for design. The low-pass filter of filter area 92 and the inverse Chebyshev approximation of approximation area 93 are selected for designing the LPIC filter macro. An output graphic 101 is displayed as a result of the selection of the low-pass filter of filter area 92 and the selection of the Chebyshev approximation of approximation area 93. Output graphic 101 is a graphical representation of the output behavior of the LPIC filter macro. Output graphic 101 has a magnitude axis 102, a frequency axis 103, a ripple area 104, and graphic lines 107, 108, and 111. Ripple area 104 and graphic lines 107, 108, and 111 are also known as elements of output graphic 101 and represent the design parameters of the LPIC filter macro. For example, ripple area 104 represents the low-pass ripple parameter, graphic line 107 represents the stop-band frequency parameter, graphic line 108 represents the low-pass attenuation parameter, and graphic line 111 represents the pass-band frequency parameter. Output graphic 101 is used to alter the design parameters of the LPIC filter macro. A selector tool 112 selects elements of output graphic 101 to alter the design parameters of the LPIC filter macro. For example, where selector tool 112 selects graphic line 107, a text message is displayed in parameter entry area 98 providing information for entering the stop-band frequency parameter of the LPIC filter macro. Selector tool 112 can be used to select ripple area 104 and graphic lines 108 and 111 to enter the corresponding design parameters of the LPIC filter macro. Macro area 97 is selected using selector tool 112 to create the LPIC filter macro using the design parameters of the LPIC filter macro. The configuration data of the LPIC filter macro is transmitted to the FPAA to configure it to operate as a low-pass inverse Chebyshev filter device. In addition, results area 94 can be used in cooperation with view results area 96 to display the results of altering the design parameters of the LPIC filter macro. For example, selecting the magnitude response format of results area 94 and selecting view results area 96 using selector tool 112 displays the magnitude response of the LPIC filter macro.

By now it should be appreciated that a method has been provided for configuring a programmable semiconductor device. The method includes using macros having configuration data to manufacture a programmable semiconductor device. An advantage of using macros is the elimination of conversion processes to convert high level design data to configuration data. Another advantage of the method is that it is time efficient and reliable since it eliminates the steps for converting design data to configuration data.

What is claimed is:

1. A method for configuring a programmable semiconductor device, comprising:

provide a macro from a macro library, wherein the macro includes a bitstream for altering the operation of the programmable semiconductor device; and programming the programmable semiconductor device with the bitstream from the macro.

2. The method of claim 1, further including:

placing the macro in a work area having a bitstream;

placing a second macro having a bitstream in the work area; and connecting the macro to the second macro and wherein the programming step includes combining the bitstreams of the macro, the second macro, and the work area to generate a combined bitstream and programming the programmable semiconductor device with the combined bitstream.

3. The method of claim 2, wherein the step of connecting the macro to the second macro includes signaling when a valid connection between the macro and the second macro is made.

4. The method of claim 2, wherein the step of connecting the macro to the second macro includes using color codes to signal a valid connection between the macro and the second macro.

5. The method of claim 2, wherein the step of connecting the macro to the second macro includes using text messages to signal a valid connection between the macro and the second macro.

6. The method of claim 2, wherein the step of connecting the macro to the second macro includes highlighting a terminal of the second macro to signal a valid connection between the macro and the second macro.

7. The method of claim 2, wherein the step of connecting the macro to the second macro includes staggering an input terminal of the macro with respect to an output terminal of the second macro.

8. The method of claim 1, wherein the bitstream of the macro alters a switch configuration of the programmable semiconductor device.

9. The method of claim 1, wherein the programmable semiconductor device includes a switch and uses switched-capacitor technology and wherein the bitstream of the macro alters the configuration of the switch so that the programmable semiconductor device operates as an analog device.

10. A method for configuring a semiconductor device, comprising:

selecting a macro having a bitstream from a macro library; and programming the semiconductor device with the bitstream of the macro to alter a circuit configuration of the semiconductor device so that the semiconductor device operates as an analog device.

11. The method of claim 10, further including:

providing a design area having a bitstream; and combining the bitstream of the design area and the bitstream of the macro to generate a combined bitstream and wherein the programming step includes programming the semiconductor device with the combined bitstream.

12. The method of claim 10, further including:

performing simulations of the semiconductor device to create a database;

generating performance data of the macro in accordance with the database; and displaying the performance data of the macro.

13. The method of claim 12, further including manipulating a parameter of the macro to alter the bitstream of the macro.

14. The method of claim 10, further including creating the macro by:

providing a circuit;

displaying the circuit in a first configuration; and displaying the circuit in a second configuration.

15. The method of claim 14, wherein the circuit is a switched-capacitor circuit that includes a switch and a capacitor and during the first configuration the switch is open and during the second configuration the switch is closed.

16. The method of claim 10, wherein the semiconductor device uses switched-capacitor technology and the bitstream alters the configuration of a switch within the semiconductor device.

17. The method of claim 10, wherein the semiconductor device includes a switch and a capacitor and the bitstream controls the opening and closing of the switch so that the semiconductor device operates as an analog device.

18. A method for configuring a semiconductor device, comprising:

provinding a schematic representation of the semiconductor device, wherein a cell of the schematic representation corresponds to a cell of the semiconductor device and the cell of the schematic representation includes a bitstream for altering the circuit configuration of the semiconductor device; and programming the semiconductor device with the bitstream of the cell of the schematic representation to alter the configuration of a switch in the cell of the semiconductor device.

19. The method of claim 18, wherein the cell of the semiconductor device further includes a capacitor and switched-capacitor technology is used to configure the semiconductor device, wherein the bitstream controls the opening and closing of the switch.

20. The method of claim 18, further including:

selecting a macro from a macro library, wherein the macro has a bitstream for altering the configuration of the semiconductor device; and placing the macro in the cell of the schematic representation so that the bitstream of the cell is combined with the bitstream of the macro, wherein the programming step includes programming the semiconductor device with the combined bitstream.

* * * * *